(12) United States Patent
Palmer et al.

(10) Patent No.: US 8,770,623 B1
(45) Date of Patent: Jul. 8, 2014

(54) RAKE AND TELESCOPE ADJUSTABLE STEERING COLUMN WITH SPRING SUPPORT

(71) Applicants: Travis L. Palmer, Frankenmuth, MI (US); Terry L. McDonald, Merrill, MI (US)

(72) Inventors: Travis L. Palmer, Frankenmuth, MI (US); Terry L. McDonald, Merrill, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/828,086

(22) Filed: Mar. 14, 2013

(51) Int. Cl.
*B62D 1/187* (2006.01)

(52) U.S. Cl.
USPC .......................................... 280/775

(58) Field of Classification Search
CPC .......... B62D 1/18; B62D 1/184; B62D 1/185; B62D 1/187; B62D 1/189

USPC ............................................. 280/775; 74/493
See application file for complete search history.

(56) References Cited

U.S. PATENT DOCUMENTS 5,941,129 A * 8/1999 Anspaugh et al. .............. 74/493
6,357,794 B1 * 3/2002 DuRocher ..................... 280/777

* cited by examiner

*Primary Examiner* — Ruth Ilan
(74) *Attorney, Agent, or Firm* — Cantor Colburn LLP

(57) ABSTRACT

An adjustable steering column for a vehicle is provided. The adjustable steering column includes a mounting bracket having a first outer leg, a second outer leg and a cross bar connecting the first and second outer legs. A compression bracket is positioned between the outer legs and includes a first inner leg, a second inner leg and a lower plate connecting the first and second inner legs. The lower plate includes a spring slot. A column jacket is secured to the compression bracket and extends along a first axis. A rake bolt extends through the mounting bracket and compression bracket. A coil spring is seated on the cross bar and is secured to the rake bolt. The coil spring extends through the spring slot in the lower plate and supports the column jacket with the steering column in an unlocked condition.

9 Claims, 3 Drawing Sheets

RAKE AND TELESCOPE ADJUSTABLE STEERING COLUMN WITH SPRING SUPPORT

BACKGROUND OF THE INVENTION

The following description relates to an adjustable steering column in a vehicle, and in particular, a support in the adjustable steering column.

A steering column may be adjustable in a rake direction and a telescope direction. To adjust the steering column, it is placed in an unlocked condition where various components are movable relative to another. In the unlocked condition, the steering column may be insufficiently supported in the rake direction.

To prevent the steering column from suddenly dropping to a lowest adjustment position upon reaching the unlocked condition, a pair of torsion springs may counterbalance the weight of steering column, steering wheel and air bag mass. The torsion springs may react against a clamping bolt extending across the steering column, and may be positioned at opposite ends or sections of the clamping bolt. For example, a torsion spring may react against the clamping bolt at each side of the steering column. Additional components may be added to the steering column for the torsion springs to react against. However, this adds to the complexity and increases costs.

In the configurations above, the torsion springs may rub against themselves and/or nearby components of the steering column, resulting in objectionable noise. In steering columns adjustable in a rake direction only, the torsion springs may be replaced with a single coil spring centrally below and seated against a steering column jacket. However, such a configuration is not suitable for a steering column adjustable in both rake and telescope directions, because the coil spring cannot accommodate relative axial movement between the steering column jacket and stationary bracket during adjustment of the steering column in the telescope direction.

Accordingly, it is desirable to provide a support in a steering column that may accommodate adjustment in both rake and telescope directions without the drawbacks detailed above.

SUMMARY OF THE INVENTION

According to an exemplary embodiment of the present invention, there is provided an adjustable steering column for a vehicle. The adjustable steering column includes a mounting bracket configured to be secured to an adjacent vehicle component, the mounting bracket having a first outer leg, a second outer leg, and a cross bar connecting the first outer leg to the second outer leg, the first outer leg and second outer leg each include a rake slot. A compression bracket includes a first inner leg, a second inner leg, and a lower plate connecting the first inner leg to the second inner leg. The first inner leg and second inner leg each include a telescope slot and the lower plate includes a spring slot. A column jacket is secured to the compression bracket and extends along a first axis. The column jacket includes a lower jacket and an upper jacket telescopically coupled to the lower jacket. A rake bolt extends through the mounting bracket and compression bracket and is movable in a rake direction. A coil spring is seated on the cross bar of the mounting bracket and is secured to the rake bolt, the coil spring extending through the spring slot in the lower plate of the compression bracket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
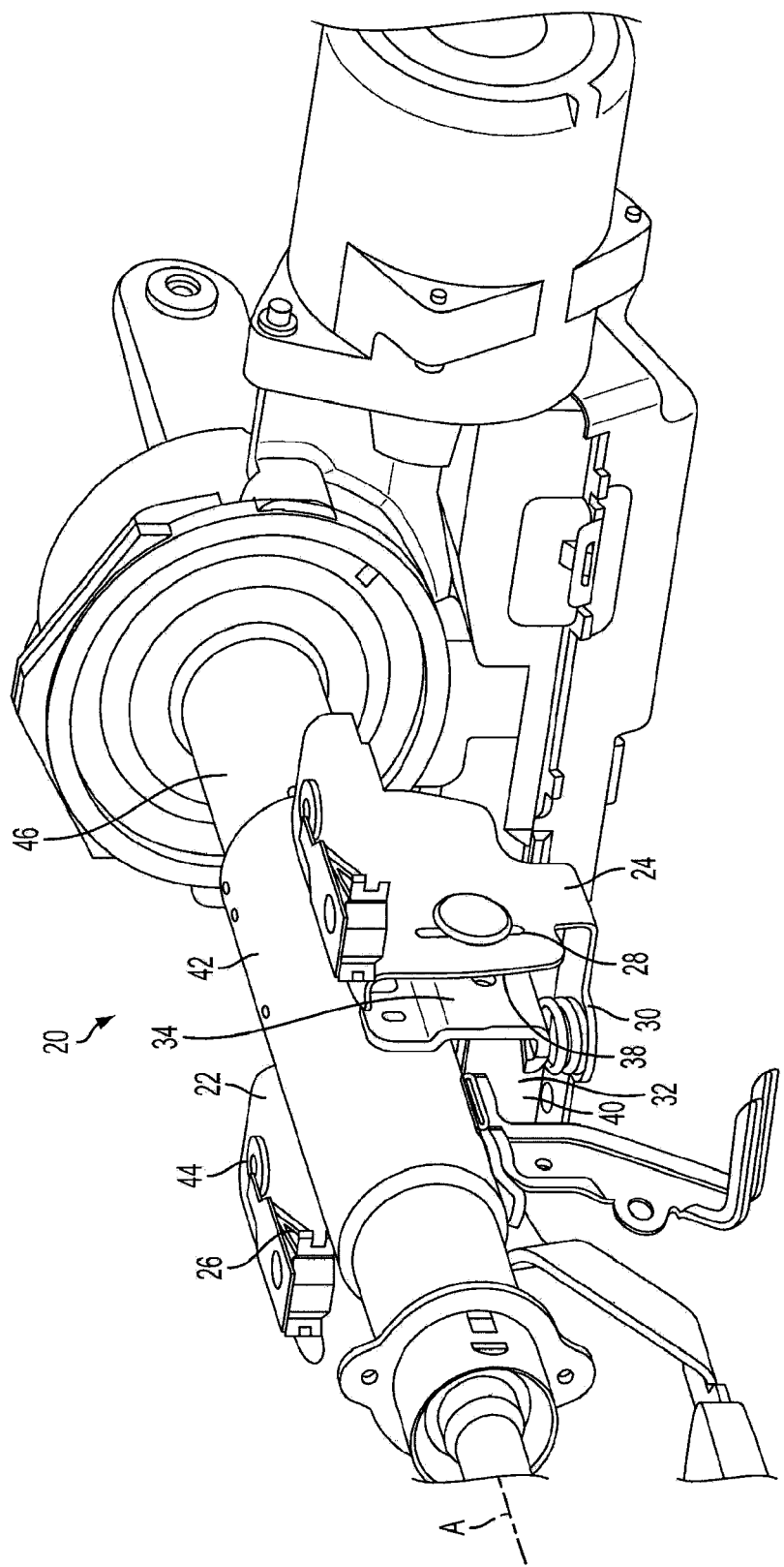
FIG. 1 is a perspective view of an adjustable steering column according to an exemplary embodiment of the present invention.

Referring now to the Figures, where the invention will be described with reference to specific embodiments, without limiting same, FIG. 1 illustrates an adjustable steering column 20 according to an exemplary embodiment of the present invention.

Referring to FIG. 1, the adjustable steering column 20 includes a mounting bracket 22 having a first outer leg 24 and a second outer leg 26. The mounting bracket is secured to an adjacent vehicle component to secure the adjustable steering column in the vehicle. Each outer leg 24, 26 includes a rake slot 28, configured to accommodate adjustment of the steering column in a rake direction. A cross bar 30 extends between and connects the first outer leg 24 to the second outer leg 26.

Figure 2:
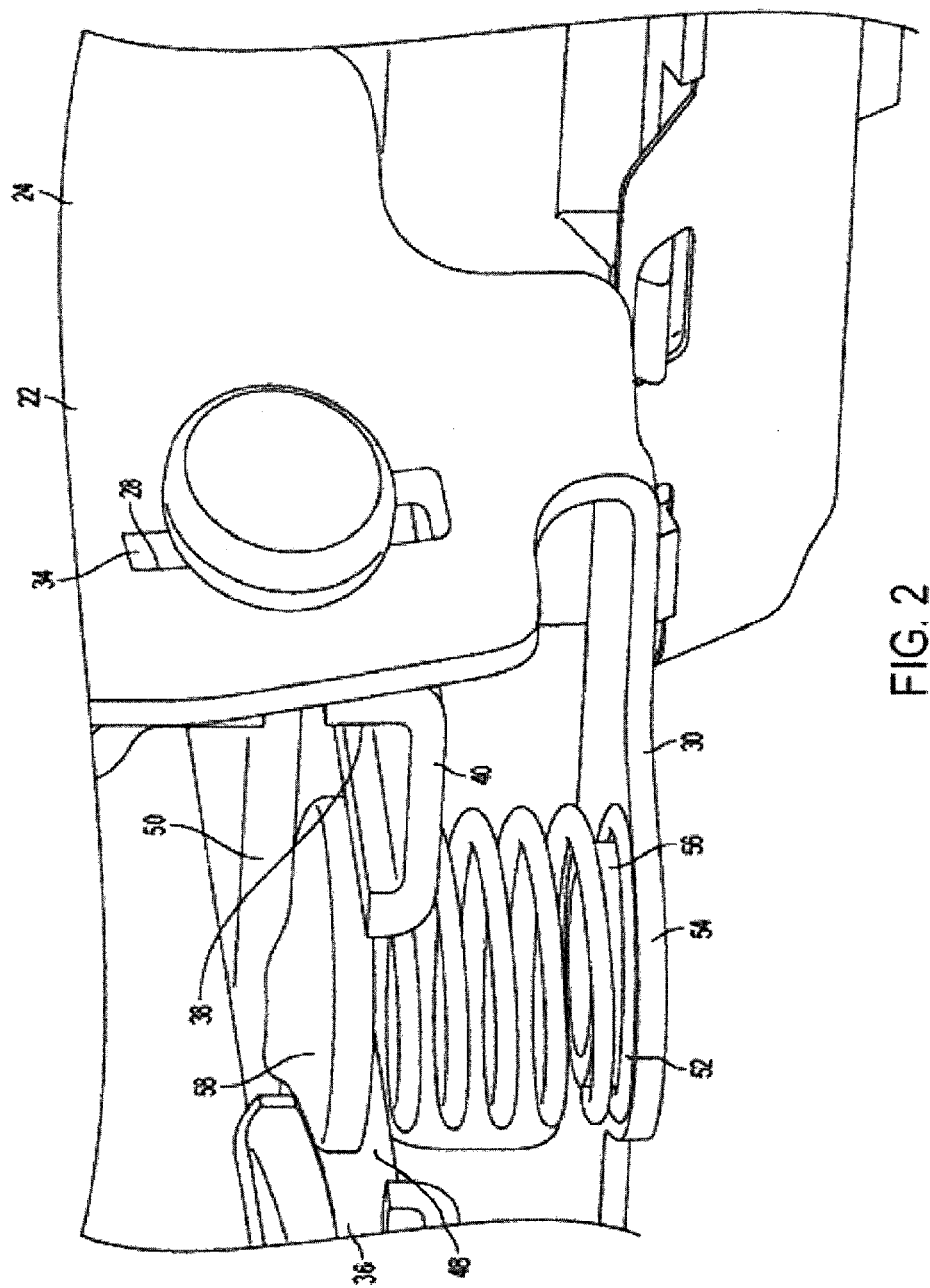
FIG. 2 is a perspective view of a portion of the adjustable steering column of FIG. 1 according to an exemplary embodiment of the present invention.

The adjustable steering column 20 also includes a compression bracket 32. The compression bracket 32 is positioned between the first and second outer legs 24, 26 of the mounting bracket 22. The compression bracket 32 includes a first inner leg 34 and a second inner leg 36 (FIG. 2). Each inner leg 34, 36 includes a telescope slot 38 formed therein to accommodate adjustment of the steering column 20 in the telescope direction. A lower plate 40 extends between and connects the first inner leg 34 to the second inner leg 36.

The adjustable steering column 20 further includes a column jacket 42. The column jacket 42 extends between the first inner leg 34 and second inner leg 36 along a first axis 'A'. The column jacket 42 is secured to the compression bracket 32, for example, by welding. In an exemplary embodiment, the column jacket 42 includes an upper jacket 44 and a lower jacket 46. The upper jacket 44 and the lower jacket 46 co-extend and are telescopically coupled to one another to allow for relative movement in the telescope direction. In an exemplary embodiment, the upper jacket 44 and lower jacket 46 extend coaxially together.

FIG. 2 is a perspective view of a portion of the adjustable steering column 20 shown in FIG. 1. In FIG. 2, the compression bracket 32 is shown as a cross section. With reference to FIG. 2, the lower plate 40 of the compression bracket 32 includes a spring slot 48 formed therein. In an exemplary embodiment, the spring slot 48 extends generally in a direction of the first axis 'A', and may extend parallel to the first axis 'A'. The spring slot 48 may be an open slot having an open end, or a closed slot formed completely within the lower plate 40 of the compression bracket 32.

A rake bolt 50 extends through the mounting bracket 22 and compression bracket 32. In particular, the rake bolt 50 extends through the rake slots 28 formed in the outer legs 24, 26 of the mounting bracket 22 and the telescope slots 38 formed in the inner legs 34, 36 of the compression bracket 32. The rake bolt 50 is movable in the rake direction within the rake slots 28 during adjustment of the steering column 20 in the rake direction. The compression bracket 32 is movable relative to the rake bolt, with the upper jacket 44 of the column jacket 42 during adjustment of the steering column in the telescope direction. During adjustment of the steering column 20 in the telescope direction, the telescope slots 38 move relative to the rake bolt 50.

A coil spring 52 is seated on the cross bar 30 of the mounting bracket 22. The cross bar 30 includes a spring seat 54 on which the coil spring 52 may be seated. In an exemplary embodiment, the spring seat 54 includes a post 56 extending from the cross bar 30 that is configured to extend within the coil spring 52 through a first end of the coil spring 52.

A second end of the coil spring 52 is seated against a seat plate 58. In an exemplary embodiment, the seat plate 58 may be a stamped plate, but is not limited thereto. In an exemplary embodiment, the second end of the coil spring 50 may be secured within the seat plate 58 by, for example, spot welding, threading, or with another suitable fastening mechanism. The seat plate 58 is connected to the rake bolt 50 and is movable with the rake bolt 50 during adjustment in the rake direction, and may be secured to the rake bolt 50 using a suitable fastening technique. For example, the seat plate 58 may be shaped so that it is sufficiently secured to the rake bolt 50, a fastener may secure the seat plate 58 to the rake bolt 50, and/or the seat plate 58 may be urged against the rake bolt 50 with sufficient force by the coil spring 52 to maintain its position relative to the rake bolt 50.

Figure 3:
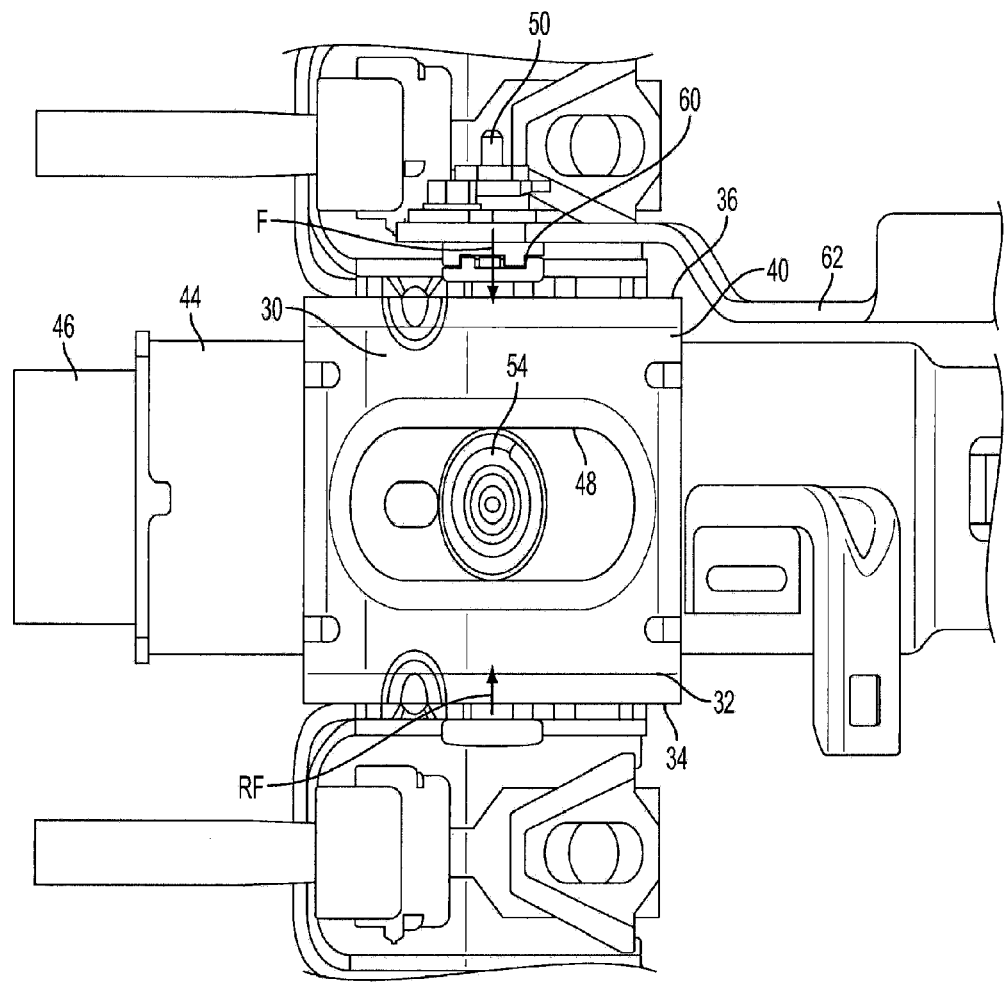
FIG. 3 is a bottom view of the adjustable steering column of FIG. 1 according to an exemplary embodiment of the present invention.

FIG. 3 is a bottom view of the adjustable steering column according to an exemplary embodiment of the present invention. With reference to FIG. 3, a locking mechanism 60 is positioned on the rake bolt 50. The locking mechanism 60 is configured to selectively apply and release a clamping force 'F' along the rake bolt to place the steering column 20 in a locked condition or unlocked condition, respectively.

In an exemplary embodiment, rotation of an operating lever 62 actuates the locking mechanism 60. Rotation of the operating lever 62 in a first direction actuates the locking mechanism 60 to apply the clamping force 'F' to the steering column. In particular, the clamping force 'F' is applied to one of the outer legs 24, 26 of the mounting bracket, and in turn to one of the inner legs 34, 36 of the compression bracket 32. The clamping force 'F' is then applied to the upper jacket 44 through one of the inner legs 34, 36. A reaction force 'RF' may be applied to the upper jacket 44 through another one of the inner legs 34, 36 and another one of the outer legs 24, 26 to clamp the upper jacket 44 against adjustment in the rake and telescope directions.

In particular, the clamping force 'F' secures the upper jacket 44 against telescope movement relative to the lower jacket 46, and secures the compression bracket 32 together with the column jacket 42 against movement in the rake direction relative to the mounting bracket 22. Thus, with the clamping force 'F' applied, the mounting bracket 22 supports the column jacket 42 in the rake direction via the compression bracket 32. With the clamping force 'F' applied, the steering column 20 is in the locked condition.

Rotation of the operating lever 62 in a second direction, opposite to the first direction actuates the locking mechanism 60 to release the clamping force 'F'. With the clamping force 'F' released, the steering column 20 is in the unlocked condition. Here, the clamping force 'F' is released from the outer legs 24, 26 and inner legs 34, 36, and thus, from the upper jacket 44. Accordingly, the upper jacket 44 may be adjusted relative to the lower jacket 46 in the telescope direction. Thus, the steering column 20 is adjustable in the telescope direction.

During adjustment in the telescope direction, the compression bracket 32 moves with the upper jacket 44 relative to the mounting bracket 22 and rake bolt 50. The telescope slots 38 move relative to the rake bolt 50. In addition, the spring slot 48 moves relative to the coil spring 52. The coil spring 52 does not move in the telescope direction because one end is seated against the stationary cross bar 30 and the other end is seated again the seat plate 58 fastened to the rake bolt 50, which is stationary in the telescope direction.

Additionally, in the unlocked condition the steering column 20 is adjustable in rake direction. During adjustment in the rake direction, the compression bracket 32, column jacket 42 and rake bolt 50 are movable relative to the mounting bracket 22 in the rake direction. In an exemplary embodiment, the rake bolt 50 is movable with the compression bracket 32 in the rake direction due a force applied to the rake bolt 50 in the rake direction by the telescope slots 38, through which the rake bolt 50 extends.

In addition, in the unlocked condition, the column jacket 42 is supported in the rake direction by the coil spring 52. In an exemplary embodiment, the coil spring 52 supports the rake bolt 50 and the compression bracket 32 by way of the rake bolt 50 extending through the telescope slots 38 on the compression bracket 32. In turn, the coil spring 52 also supports the column jacket 42 by way of the compression bracket 32 to which the column jacket 42 is secured.

In the exemplary embodiments above, the steering column, and in particular, the column jacket may be supported in the rake direction by a coil spring extending from the cross bar of the mounting bracket through the spring slot of the compression bracket to the rake bolt when the steering column is in the unlocked condition. By extending the coil spring through the spring slot formed in the compression bracket, the compression bracket may be movable relative to the coil spring, thereby allowing telescope adjustment of the steering column while providing a simplified construction to support to the column jacket in the rake direction. Thus, the use of multiple torsion springs to support a column jacket with the steering column in the unlocked condition may be avoided. As a result, related mounting features and/or components may be eliminated, thereby reducing costs and design complexity. In addition, the exemplary embodiments described above may be used in steering columns that are adjustable only in the rake direction, or adjustable in both the rake and telescope directions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column for a vehicle, the adjustable steering column comprising:

a mounting bracket configured to be secured to an adjacent vehicle component, the mounting bracket comprising a first outer leg, a second outer leg, and a cross bar connecting the first outer leg to the second outer leg, the first outer leg and second outer leg each include a rake slot;

a compression bracket comprising a first inner leg, a second inner leg, and a lower plate connecting the first inner leg to the second inner leg, the first inner leg and second inner leg each including a telescope slot and the lower plate comprising a spring slot;

a column jacket secured to the compression bracket and extending along a first axis, the column jacket comprising a lower jacket and an upper jacket telescopically coupled to the lower jacket;

a rake bolt extending through the mounting bracket and compression bracket, and movable in a rake direction; and a coil spring seated on the cross bar of the mounting bracket and secured to the rake bolt, the coil spring extending through the spring slot in the lower plate of the compression bracket.

2. The adjustable steering column of claim 1, further comprising a seat plate fixed to the rake bolt, and the coil spring is seated against the seat plate to support the column jacket in a rake direction via the rake bolt when the adjustable steering column is in an unlocked condition.

3. The adjustable steering column of claim 2, wherein the compression bracket is movable relative to the coil spring such that the spring slot in the lower plate moves relative to the coil spring.

4. The adjustable steering column of claim 1, wherein the coil spring is seated at a seat on the cross bar of the mounting bracket, and the seat includes a post configured to extend within the coil spring.

5. The adjustable steering column of claim 1, further comprising a locking mechanism configured to selectively apply a clamping force to place the steering column in a locked condition and selectively release the clamping force to place the steering column in an unlocked condition.

6. The adjustable steering column of claim 5, wherein the clamping force causes the mounting bracket to support the compression bracket and column jacket in the rake direction when the steering column is in the locked condition.

7. The adjustable able steering column of claim 5, wherein the coil spring supports the column jacket via the compression bracket when the steering column is in the unlocked condition.

8. The adjustable steering column of claim 7, wherein the rake bolt and compression bracket are movable relative to the mounting bracket in the rake direction with the steering column in the unlocked condition.

9. The adjustable steering column of claim 8, wherein the compression bracket is movable relative to the rake bolt and coil spring in the telescope direction with the steering column in the unlocked condition.

* * * * *